(12) United States Patent  (10) Patent No.: US 12,067,976 B2
Kang et al.  (45) Date of Patent: Aug. 20, 2024

(54) AUTOMATED SEARCH AND PRESENTATION COMPUTING SYSTEM

(71) Applicant: Intuit Inc., Mountain View, CA (US)

(72) Inventors: Byungkyu Kang, San Diego, CA (US); Alexander Zhicharevich, Petah Tikva (IL); Kate Elizabeth Swift-Spong, San Diego, CA (US); Zhewen Fan, San Diego, CA (US); Elik Sror, Hod Hasharon (IL)

(73) Assignee: Intuit Inc., Mountain View, CA (US)

( * ) Notice: Subject to any disclaimer, the term of this patent is extended or adjusted under 35 U.S.C. 154(b) by 317 days.

(21) Appl. No.: 17/489,667

(22) Filed: Sep. 29, 2021

(65) Prior Publication Data
US 2023/0113607 A1  Apr. 13, 2023

(51) Int. Cl.
| | |
|---|---|
| *G10L 15/18* | (2013.01) |
| *G06F 16/9538* | (2019.01) |
| *G06F 40/284* | (2020.01) |
| *G06N 20/00* | (2019.01) |
| *G10L 15/06* | (2013.01) |
| *G10L 15/16* | (2006.01) |
| *G10L 15/22* | (2006.01) |

(52) U.S. Cl.
CPC .......... *G10L 15/18* (2013.01); *G06F 16/9538* (2019.01); *G06F 40/284* (2020.01); *G06N 20/00* (2019.01); *G10L 15/063* (2013.01); *G10L 15/16* (2013.01); *G10L 15/22* (2013.01)

(58) Field of Classification Search
CPC ....... G10L 15/18; G10L 15/063; G10L 15/16; G10L 15/22; G06F 16/9538; G06F 40/284; G06F 16/3329; G06F 16/3344; G06N 20/00; G06N 3/0464; G06N 3/048
See application file for complete search history.

(56) References Cited

U.S. PATENT DOCUMENTS

| | | | |
|---|---|---|---|
| 10,062,039 B1 * | 8/2018 | Lockett | G06N 3/044 |
| 10,692,484 B1 * | 6/2020 | Merritt | G10L 13/047 |
| 11,417,337 B1 * | 8/2022 | Shi | G10L 15/22 |
| 2011/0060587 A1 * | 3/2011 | Phillips | G10L 15/30 |
| | | | 704/235 |

(Continued)

OTHER PUBLICATIONS

Zhong, J., et al., "Predicting Customer Call Intent by Analyzing Phone Call Transcripts Based on CNN for Multi-Class Classification", Signal 2019, Jul. 8, 2019, 12 pages.

(Continued)

*Primary Examiner* — Michael Colucci
(74) *Attorney, Agent, or Firm* — Lathrop GPM LLP

(57) ABSTRACT

A method including transcribing, into digital tokens, utterances from a conversation between an agent and a person. The method also includes embedding the digital tokens into an utterances tensor including sequences of the digital tokens. The method also includes obtaining a metadata tensor by encoding metadata related to the utterances into the metadata tensor. The method also includes executing a machine learning model which takes, as input, the utterances tensor and the metadata tensor, and which outputs a predicted source article predicted to be related to the utterances. The method also includes generating an interactive link to the predicted source article.

15 Claims, 8 Drawing Sheets

(56) References Cited

U.S. PATENT DOCUMENTS

| | | | | |
|---|---|---|---|---|
| 2012/0159349 A1* | 6/2012 | Kansky | ................ | H04L 51/046 |
| | | | | 715/752 |
| 2016/0042419 A1* | 2/2016 | Singh | ................ | G06Q 30/0631 |
| | | | | 705/26.41 |
| 2017/0300831 A1* | 10/2017 | Gelfenbeyn | ........... | G06N 3/004 |
| 2020/0203017 A1* | 6/2020 | Dower | .................. | G16H 50/20 |
| 2021/0382925 A1* | 12/2021 | Fincun | ................... | G06F 40/35 |
| 2022/0092683 A1* | 3/2022 | Kochura | .............. | G06F 40/295 |
| 2022/0131975 A1* | 4/2022 | Krishnan | ............... | G06N 20/20 |
| 2022/0188652 A1* | 6/2022 | Pabrinkis | ................ | G06F 18/22 |
| 2022/0277290 A1* | 9/2022 | Roongta | ............. | G06Q 20/385 |
| 2022/0358462 A1* | 11/2022 | Oldfield | ................... | G06N 5/02 |

OTHER PUBLICATIONS

"Amazon Connect Wisdom Provides Contact Center Agents the Informaiton They need to Quickly Solve Customer Issues", https://aws.amazon.com/about-aws/whats-new/2020/12/amazon-connect, Dec. 1, 2020, 3 pages.

"One Knowledge Base. All the Answers.", https://www.knowledgebase.ai, Sep. 28, 2021, 16 pages.

\* cited by examiner

| casenumber | service_type | participant | datetime | content |
|---|---|---|---|---|
| 455985409 | Tax Support | agent | 2020-02-16 07:37... | Income is a variable that could be causing you to receive less. see the following link- https://www.irs... |
| 455985409 | Tax Support | customer | 2020-02-16 07:37... | Thanks! It was really helpful. |

URL  https://www.irs.gov/pub/irs-pdf/p970.pdf — 318

Source  IRS — 320

URL head  irs.gov — 322

US 12,067,976 B2

AUTOMATED SEARCH AND PRESENTATION COMPUTING SYSTEM

BACKGROUND

Natural language machine learning models may be used to encode live conversations or other utterances into a digital format known as digital tokens representing words and/or phrases. However, additional automatic processing of the digital tokens may be desirable.

SUMMARY

The one or more embodiments provide for a method. The method includes transcribing, into digital tokens, utterances from a conversation between an agent and a person. The method also includes embedding the digital tokens into an utterances tensor including sequences of the digital tokens. The method also includes obtaining a metadata tensor by encoding metadata related to the utterances into the metadata tensor. The method also includes executing a machine learning model which takes, as input, the utterances tensor and the metadata tensor, and which outputs a predicted source article predicted to be related to the utterances. The method also includes generating an interactive link to the predicted source article.

The one or more embodiments also provide for a system. The system includes a processor and a data repository in communication with the processor. The data repository stores digital tokens generated from utterances transcribed from a conversation between an agent and a person. The data repository also stores an utterances tensor including sequences of the digital tokens embedded into a tensor data structure. The data repository also stores a metadata tensor. The data repository also stores an interactive link to a predicted source article. The system also includes a transcription engine configured to transcribe the utterances into the digital tokens. The system also includes a pre-processing system configured to embed the digital tokens into the utterances tensor. The pre-processing system is also configured to encode metadata related to the utterances into the metadata tensor. The system also includes a machine learning model configured to take, as input the utterances tensor and the metadata tensor. The machine learning model is also configured to output a predicted source article predicted to be related to the utterances. The system also includes a link generator configured to generate the interactive link to the predicted source article.

The one or more embodiments also provide for a method of training a machine learning model. The method includes receiving a past utterances tensor including sequences of digital tokens that represent past utterances from a conversation between an agent and a person. A known source article is known to be relevant to the conversation. The method also includes receiving a past metadata tensor representing metadata related to the past utterances. The method also includes predicting, using the machine learning model, a predicted source article predicted to be related to the utterances. The machine learning model takes, as input, the past utterances tensor and the past metadata tensor. The machine learning model generates, as output, the predicted source article. The method also includes generating a loss function from comparing the predicted source article to the known source article. The predicted source article and the known source article are different. The method also includes generating an updated machine learning model by using the loss function to change a parameter of the machine learning model. The method also includes establish a trained machine learning model by repeating, until convergence, receiving the past utterances tensor, receiving the past metadata tensor, predicting the predicted source article, generating the loss function, and generating the updated machine learning model.

Other aspects of the one or more embodiments will be apparent from the following description and the appended claims.

DETAILED DESCRIPTION

Figure 1A:
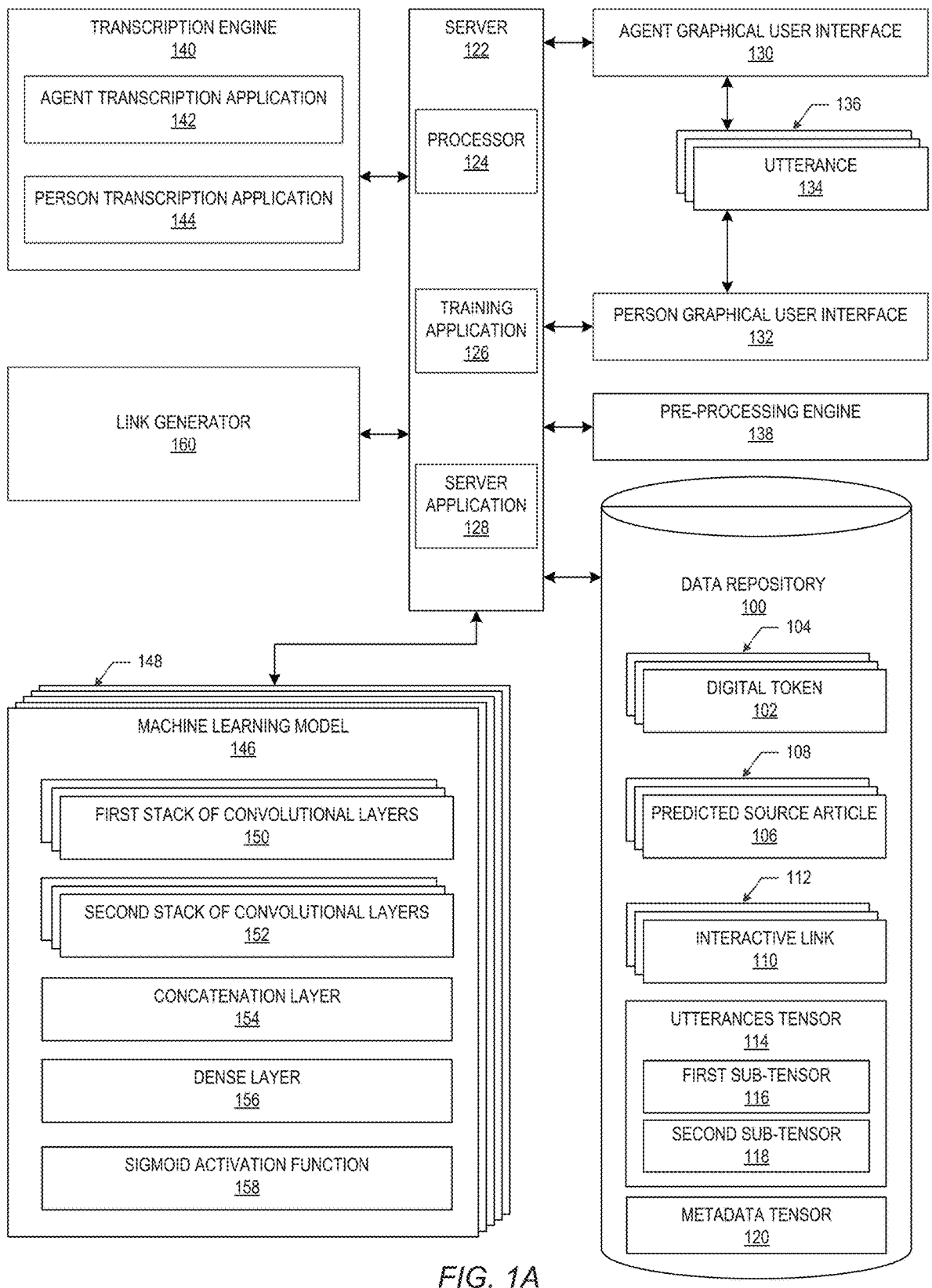
FIG. 1A shows a computing system, in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The term "about," when used with respect to a computer or a computer-executed instruction, refers to a computer engineering tolerance anticipated or determined by a computer scientist or computer technician of ordinary skill in the art. The exact quantified degree of an engineering tolerance depends on the software and/or hardware in use and the technical property being measured. For a non-limiting example, two processes may be "about" concurrent when one process is executed within a pre-defined number of processor operations of the other process. In another non-limiting example in which an algorithm compares a first property to a second property, the first property may be "about" equal to the second property when the two properties are within a pre-determined range of measurement. Engineering tolerances could be loosened in other embodiments; i.e., outside of the above-mentioned pre-determined range in one embodiment, but inside another pre-determined range in another embodiment. In any case, the ordinary artisan is capable of assessing what is an acceptable engineering tolerance for a particular algorithm, process, or hardware arrangement, and thus is capable of assessing how to determine the variance of measurement contemplated by the term "about."

As used herein, the term "connected to" contemplates multiple meanings. A connection may be direct or indirect. For example, computer A may be directly connected to computer B by means of a direct communication link. Computer A may be indirectly connected to computer B by means of a common network environment to which both computers are connected. A connection may be wired or wireless. A connection may be temporary, permanent, or semi-permanent communication channel between two entities.

As used herein, an entity is an electronic device, not necessarily limited to a computer. Thus, an entity may be a mobile phone, a smart watch, a laptop computer, a desktop computer, a server computer, etc. As used herein, the term "computer" is synonymous with the word "entity," unless stated otherwise.

In general, the one or more embodiments related to solving a technical problem with respect to using a computer to automatically predict, locate, and refer stored digital source articles that are relevant to an ongoing conversation, or other utterances, being made in real time. "Real time" means a time during the conversation. While natural language processing machine learning models can be used to digitally encode the conversation or utterances into digital tokens, a computer cannot know which tokens should be used as keywords to look up automatically a relevant source article.

The one or more embodiments are directed towards an improved machine learning model that can be used to automatically predict a relevant source article for presentation to one or more users either participating in or observing the conversation being recorded. The improved machine learning model uses two or more stacks of convolutional layers, one for each speaker in the conversation. Input vectors in the form of tensors formed from the digital tokens extracted from the conversation are input to the respective convolutional layers. The outputs of the convolutional layers are concatenated and, together with a metadata tensor encoding metadata relevant to the conversation, provided to a dense layer. A sigmoid activation function of the machine learning model then generates one or more potential predicted source articles. From one to all of the predicted source articles are then selected and presented to a graphical user interface of one or more of the participants in the conversation. The predicted source article or articles are more likely to provide additional information relevant to the conversation.

Figure 1B:
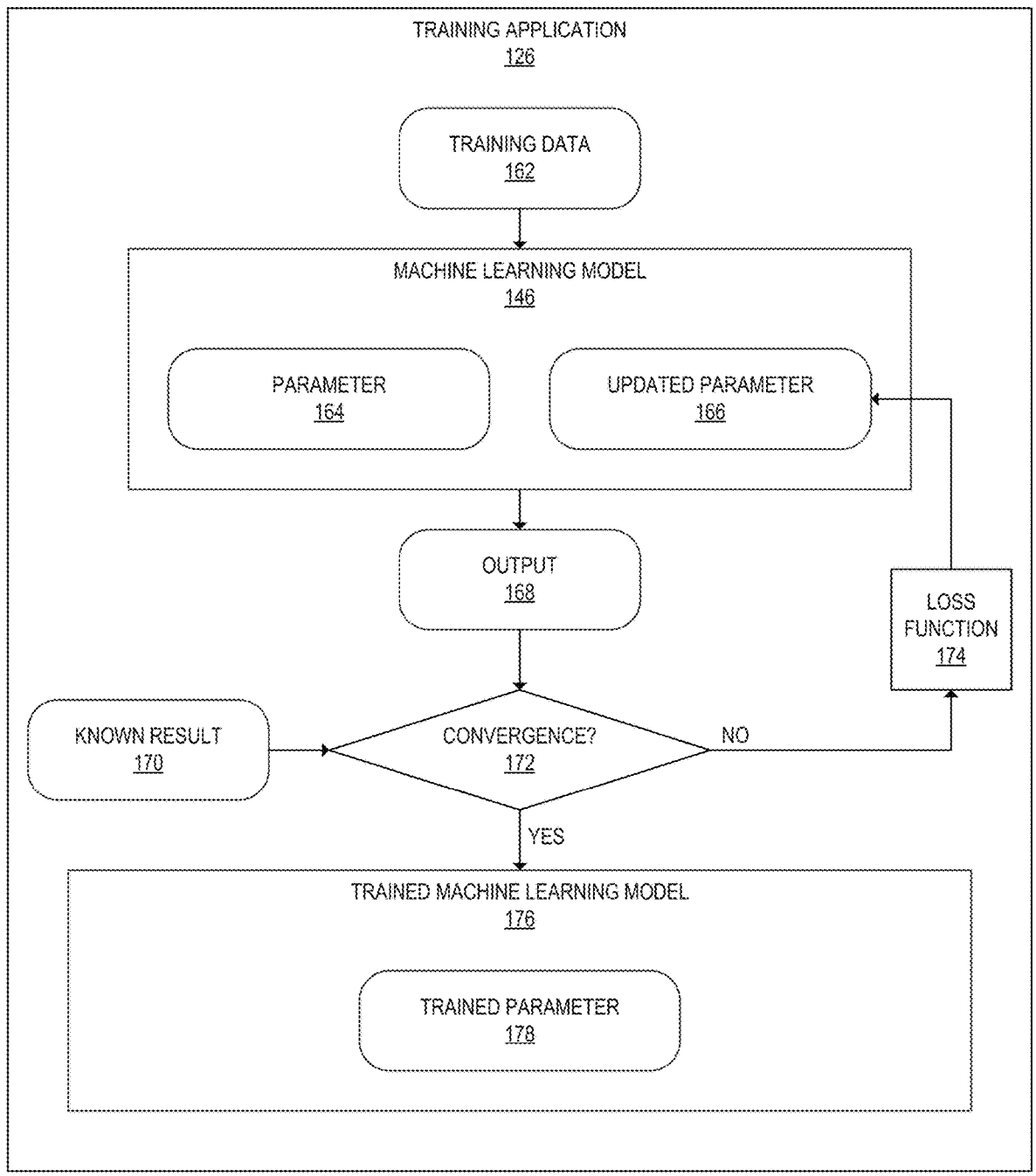
FIG. 1B shows a training application for a machine learning model, in accordance with one or more embodiments.
Figure 1C:
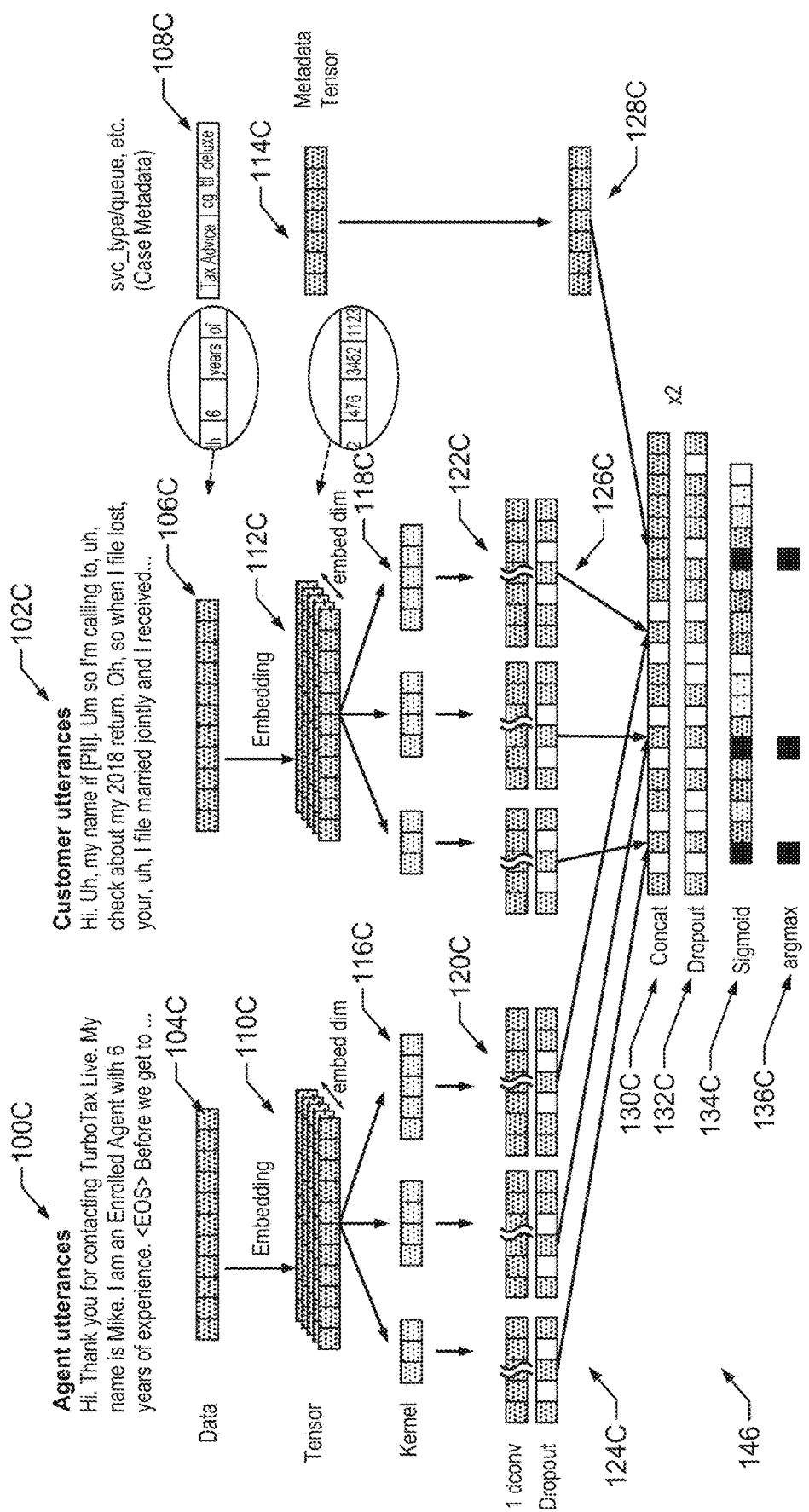
FIG. 1C shows an example of a machine learning model architecture for generating a predicted source article, in accordance with one or more embodiments.

An example of the machine learning layers is shown with respect to FIG. 1A and FIG. 1C. An example of the one or more embodiments in use is described with respect to FIG. 2A, as well as FIG. 3A and FIG. 3B.

Attention is now turned to the figures. FIG. 1A shows a computing system, in accordance with one or more embodiments. The computing system includes a data repository (100). In one or more embodiments, the data repository (100) is a storage unit and/or device (e.g., a file system, database, collection of tables, or another storage mechanism) for storing data. Further, the data repository (100) may include multiple different storage units and/or devices. The multiple different storage units and/or devices may or may not be of the same type and may or may not be located at the same physical site.

The data repository (100) stores a digital token (102) among possibly multiple digital tokens (104). The digital token (102) and/or the multiple digital tokens (104) are digital representations of a word, a phrase, a number, or a special characters transcribed from a conversation or a monologue of a human user. The digital token (102) may represent multiple words or special characters. The digital token (102) and/or the multiple digital tokens (104) are generated using the transcription engine (140), described further below according to the process described with respect to FIG. 2A.

The data repository (100) also stores a predicted source article (106) among possibly multiple source articles (108). A predicted source article (106) is an electronic data file that stores or references human-readable information pertaining to a subject. The source article is "predicted" in the sense that the predicted source article (106) is predicted by the multiple machine learning models (148), as described below and also with respect to the method of FIG. 2A. The predicted source article (106) is selected by the multiple machine learning models (148) from among the multiple source articles (108). Examples of the multiple source articles (108) include, but are not limited to, reference articles, technical journals, laws or rules, published opinions, patents, patent application publications, academic theses, news articles, or links to external websites.

The data repository (100) also stores an interactive link (110) among possibly multiple interactive links (112). The interactive link (110) is a hyperlink or other reference which a user may select in order to retrieve the predicted source article (106) or multiple source articles (108), or to otherwise view some or all of the predicted source article (106) or multiple source articles (108).

The data repository (100) also stores a utterances tensor (114). The utterances tensor (114) is a tensor that stores the digital token (102) or multiple digital tokens (104) transcribed from the utterance (134) or multiple utterances (136) made during the recorded conversation. A tensor is an data structure that describes a multilinear relationship between sets of algebraic objects related to a vector space. For example, a tensor may be a three (or more) dimensional array of numbers. Objects that tensors may map between include vectors and scalars, and even other tensors. There are different types of tensors, including scalars and vectors, dual vectors, multilinear maps between vector spaces, dot product operation tensors, and others. The utterances tensor (114) is a machine-readable vector that is configured for input to the machine learning model (146) in one or more embodiments.

The utterances tensor (114) may be considered as, or broken into, multiple sub-tensors, such as first sub-tensor (116) and second sub-tensor (118). A sub-tensor is a tensor, but is also a subset of the utterances tensor (114). For example, the utterances tensor (114) may store all of the multiple utterances (136). However, in one embodiment, the first sub-tensor (116) may store those of the multiple digital tokens (104) that relate to an agent (i.e. one person in a two or more person conversation). Likewise, the second sub-tensor (118) may store those of the multiple digital tokens (104) that relate to a person (i.e. another person in a two or more person conversation). Additional sub-tensors may be present for additional persons, or if for some other reason it is convenient to sub-divide the data stored in the utterances tensor (114) for later processing.

The data repository (100) also stores a metadata tensor (120). The metadata tensor (120) is a tensor, but stores metadata related to the utterance (134) or multiple utterances (136). For example, the metadata tensor (120) could store information such as a time stamp of when a digital token was obtained or converted, available knowledge base sources, an identity, one or multiple preferences, a description, or historical activities (e.g., a clickstream) of a speaker, a subject heading for the conversation as provided by an agent or another speaker in the conversation, a product or a service related to the conversation, or possibly many other forms of metadata.

The system shown in FIG. 1A also includes a server (122). The server (122) is one or more computers, including hardware and software, in a possibly distributed computing environment. Thus, for example, the server (122) may be one or more of the computers and/or the network shown in FIG. 4A and FIG. 4B.

Figure 4A:
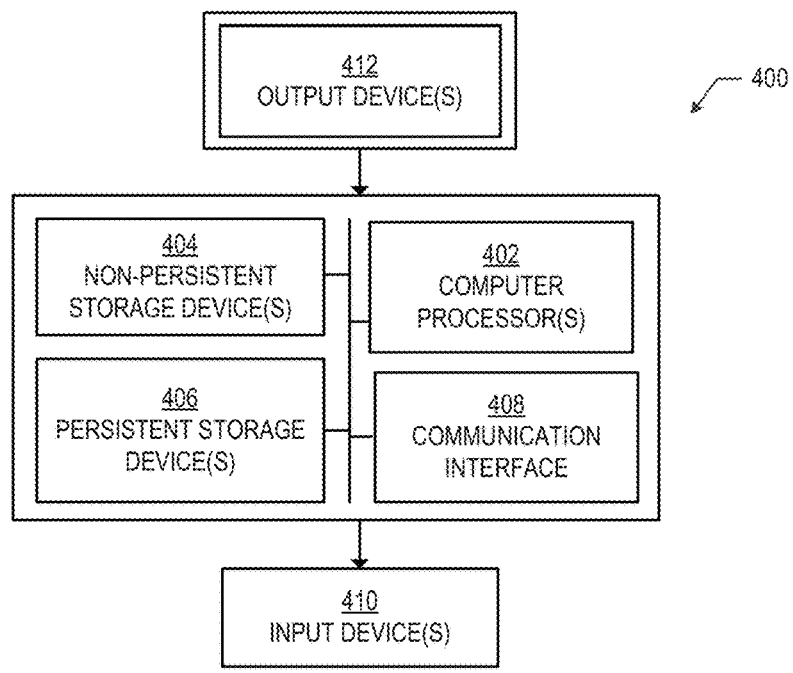
FIG. 4A and FIG. 4B shows a computing system and network environment, in accordance with one or more embodiments.

The server (122) includes a processor (124). The processor (124) is a logical or hardware processor that performs the executions necessary to accomplish the algorithms described with respect to FIG. 2A and FIG. 2B. An example of a processor is shown in FIG. 4A.

The server (122) also includes a training application (126). The training application (126) is software and/or hardware which is programmed to train the machine learning model (146), described further below. Details of the training application (126) are described with respect to FIG. 1B.

The server (122) also includes a server application (128). The server application (128) is software and/or hardware which is programmed to execute the components described with respect to FIG. 1A (e.g., the agent graphical user interface (130), the person graphical user interface (132), the pre-processing engine (138), the transcription engine (140), the machine learning model (146), and the link generator (160)). An example of the server application (128) is an encoded version of the algorithm shown in the flowchart of FIG. 2A.

The system shown in FIG. 1A also includes an agent graphical user interface (130). A graphical user interface may also be referred-to as a "GUI." The agent graphical user interface (130) is a GUI which an agent is using during execution of the one or more embodiments. The agent graphical user interface (130) may be part of a remote computing system and communicating with the server (122) over a network (e.g. the Internet), or may be a computer that is local to the system shown in FIG. 1A. The agent graphical user interface (130) allows the agent to interact with the system shown in FIG. 1A and may also provide the hardware and/or software useful for recording and digitizing the utterance (134) or multiple utterances (136) made by the agent.

The agent is a human user. The agent may be a customer service agent, subject matter expert, or some other person from whom the "person" (i.e., the other participant(s) in the conversation) seek advice. However, the one or more embodiments also contemplate that the "agent" can be any person, or perhaps an automatic chatbot. Thus, the term "agent" refers to any human user or automatic chatbot, and does not require that the human user be an agent of some business, a subject matter expert, etc. In some embodiments, multiple agents may be present, using the same or different GUIs.

The system shown in FIG. 1A also includes a person graphical user interface (132). The person graphical user interface (132) is a GUI which another person, different than the agent, is using during execution of the one or more embodiments. The person graphical user interface (132) may be part of a remote computing system and communicating with the server (122) over a network (e.g., the Internet), or may be a computer that is local to the system shown in FIG. 1A. The person graphical user interface (132) allows the person to interact with the system shown in FIG. 1A and may also provide the hardware and/or software useful for recording and digitizing the person graphical user interface (132) or 1136 made by the person.

The person is a human user. The person may be, in some embodiments, multiple people. When multiple people, other than the agent, are part of the conversation, then additional GUIs may also be present, or the multiple people may share use of one or more of the GUIs. Thus, the one or more embodiments contemplate potentially recording the utterance (134) or the multiple utterances (136) of many parties. In an embodiment, the utterance (134) or multiple utterances (136) of each user is tracked separately.

The system shown in FIG. 1A also includes an utterance (134) among multiple utterances (136). An utterance is an auditory communication (i.e., speaking, singing, snapping fingers, etc.). Most of the multiple utterances (136) are expected to be spoken words in the one or more embodiments. The utterance (134) or multiple utterances (136) may be stored in the utterances tensor (114). Because each person's utterances may be tracked, the utterances tensor (114) may include multiple sub-tensors (e.g., first sub-tensor (116) and second sub-tensor (118)) which individually store the utterances of each user in the form of digital tokens.

The system shown in FIG. 1A also includes a preprocessing engine (138). The pre-processing engine (138) is software and/or hardware that generates the utterances tensor (114) and/or other data that is formatted for input to the machine learning model (146). The pre-processing engine (138) performs the formatting. For example, the pre-processing engine (138) may transform the utterance (134) or multiple utterances (136) into the utterances tensor (114) or some other data vector suitable for input to the machine learning model (146).

The system shown in FIG. 1A also includes a transcription engine (140). The transcription engine (140) is software and/or hardware that transforms the utterance (134) or the multiple utterances (136) into one or more digital tokens. The transcription engine (140) may be located server-side so that remote computers do not need to perform the transcription or transmit the digital tokens over a network. The transcription engine (140) therefore need not be part of or directly connected to the agent graphical user interface (130) or the person graphical user interface (132). However, in some embodiments, the transcription engine (140) may be part of the agent graphical user interface (130) or the person graphical user interface (132).

The transcription engine (140) may be sub-divided into an agent transcription application (142) and a person transcription application (144). For example the transcription engine (140) may recognize which person is speaking between the agent and the person. One logical application, the agent transcription application (142), transcribes the multiple utterances (136) from the agent. The other logical application, the person transcription application (144), transcribes the multiple utterances (136) from the person. However, in an embodiment, the transcription engine (140) may transcribe some or all of the multiple utterances (136) of both users. In this case, the pre-processing engine (138) may separate different ones of the multiple utterances (136) by the two or more different users.

The system shown in FIG. 1A also includes a machine learning model (146) among possibly multiple machine learning models (148). A machine learning model is a program that has been trained to recognize certain types of patterns in data (i.e., the multiple digital tokens (104) in the utterances tensor (114)). In the one or more embodiments, the machine learning model (146) may be one of several different types of neural networks, such as a convolutional neural network.

Figure 2A:
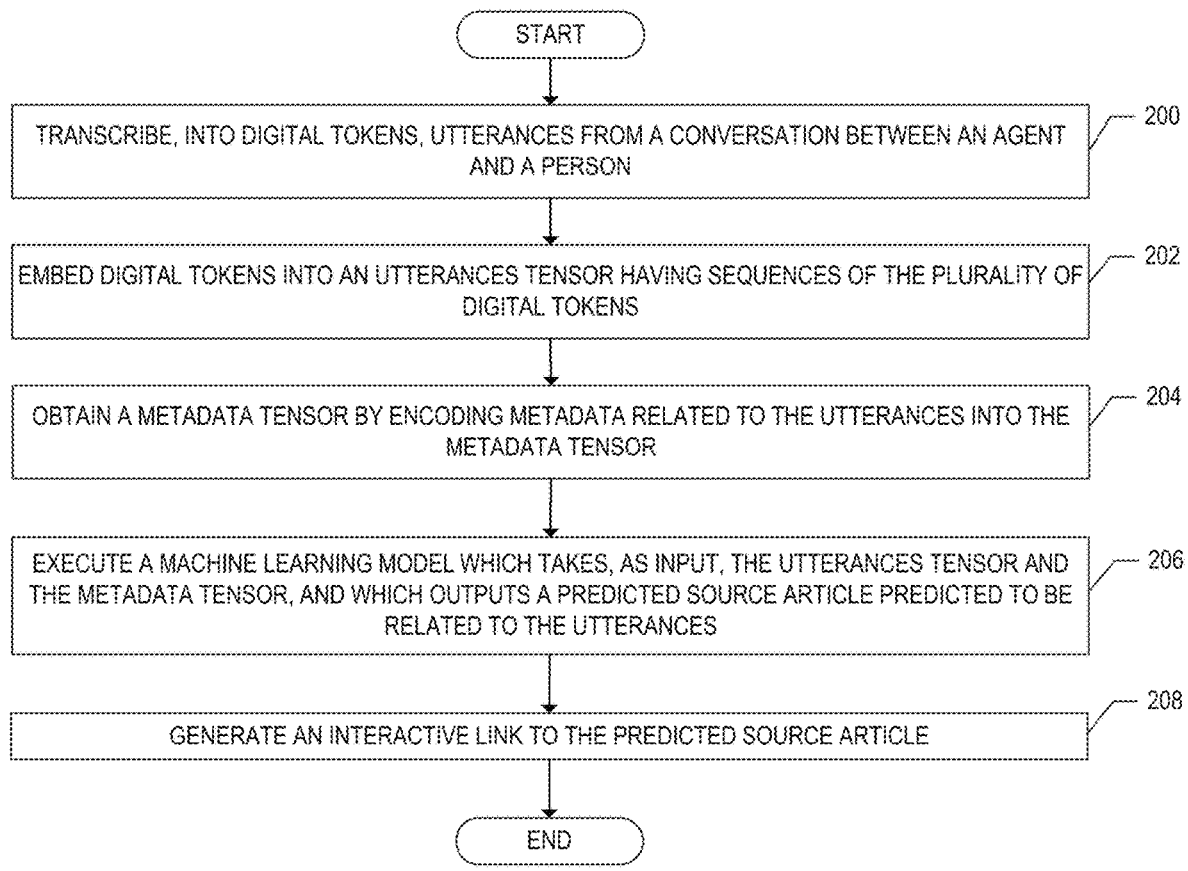
FIG. 2A shows a flowchart of a method of predicting a predicted source article, in accordance with one or more embodiments.
Figure 2B:
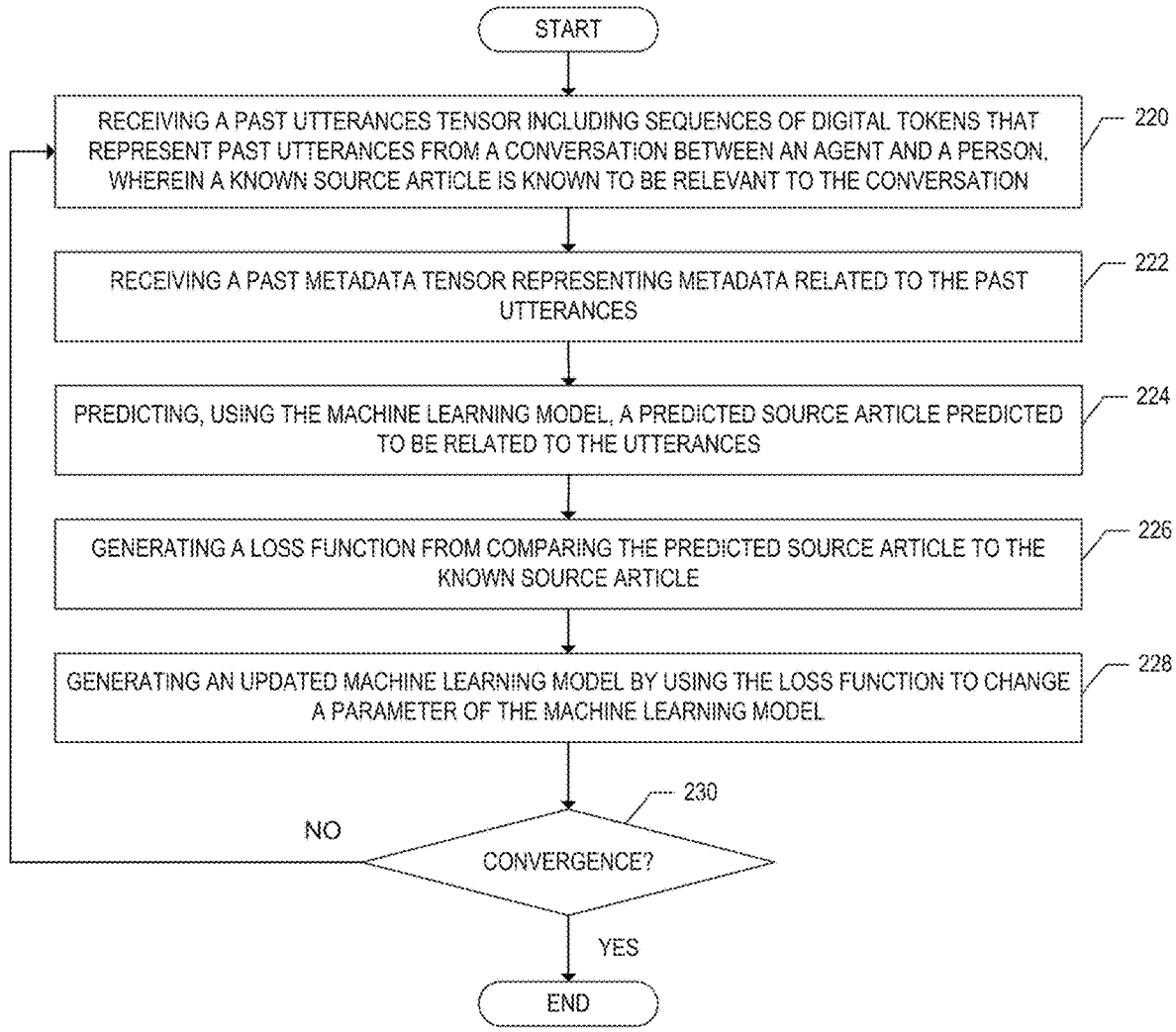
FIG. 2B shows a flowchart of a method for training a machine learning model, in accordance with one or more embodiments.

The machine learning model (146) is trained over a set of known data, as described with respect to FIG. 1B and FIG. 2B. Once the machine learning model (146) is trained, the model can identify patterns in unknown data that may reveal information of interest. The use and execution of the machine learning model (146) and/or the multiple machine learning models (148) is described with respect to the method of FIG. 2A. An example of the structure of the machine learning model (146) is shown with respect to FIG. 1C. An example of the machine learning model (146) in a specific context is shown with respect to FIG. 3A and FIG. 3B.

The machine learning model (146) may be considered a collection of logical software blocks that are executed in a particular sequence. The logical software blocks are called layers in the one or more embodiments.

The machine learning model (146) includes a first stack of convolutional layers (150). A convolutional layer is a set of rules that determine an orderly procedure where multiple sources of information are intertwined in order to find patterns in the information input to a convolutional layer. A stack of convolutional layers can better find such patterns in the input information. In the one or more embodiments, the first sub-tensor (116) containing some of the multiple digital tokens (104) describing the multiple utterances (136) of the agent is applied to the first stack of convolutional layers (150). The output of the first stack of convolutional layers (150) is one or more of the multiple source articles (108) that are related to the multiple utterances (136) of the agent.

Similarly, the machine learning model (146) includes a second stack of convolutional layers (152). In the one or more embodiments, the second sub-tensor (118) containing some of the multiple digital tokens (104) describing the multiple utterances (136) of the person is applied to the second stack of convolutional layers (152). The output of the second stack of convolutional layers (152) is one or more of the multiple source articles (108) that are related to the multiple utterances (136) of the person.

The machine learning model (146) also includes a concatenation layer (154). The machine learning model (146) is configured to combine, by concatenation or some other algorithm, the output of the first stack of convolutional layers (150), the second stack of convolutional layers (152), and the metadata tensor (120). The output of the concatenation layer is a combined tensor that is provided to the dense layer (156) described below.

The machine learning model (146) also includes a dense layer (156). The dense layer (156) is a neural network layer that is connected deeply. Connected deeply means each neuron in the dense layer receives input from multiple (possibly all) neurons of the previous layer. The dense layer (156) performs a matrix-vector multiplication. The values used in the matrix are parameters that can be trained and updated with the help of backpropagation. The output generated by the dense layer (156) is an 'm' dimensional vector. Thus, the dense layer (156) is programmed to change the dimensions of the vector. The dense layer (156) also may apply operations like rotation, scaling, translation, and other operations on the vector. The dense layer (156) is configured to output a value for the classes in the classification task being performed by the machine learning model (146). The classes are the multiple source articles (108).

The machine learning model (146) also includes a sigmoid activation function (158), which is a type of layer. The sigmoid activation function (158) is a mathematical function that converts a vector of numbers into a vector of probabilities, where the probabilities of each value of the vector is represented in a range between 0 and 1. The sigmoid activation function (158) is programmed to normalize the outputs of the dense layer (156). In particular, the sigmoid activation function (158) converts the outputs of the dense layer (156) from weighted sum values into probabilities such that each probability is independent of other probabilities in the outputs. The sigmoid activation function thus enables the network to return more than one prediction per inference. Accordingly, the machine learning model (146) can recommend multiple predictions with their corresponding probabilities. Each value in the output of the sigmoid activation function (158) is interpreted as the probability of membership for each class being predicted (i.e., the probabilities that the multiple source articles (108) are related to the conversation between the agent and the person).

As indicated above, there may be multiple machine learning models (148). For example the multiple machine learning models (148) may include natural language processing machine learning models that generate the multiple digital tokens (104) from the multiple utterances (136). The multiple machine learning models (148) may also include additional machine learning models that determine a probable category of the multiple source articles (108). When the multiple source articles (108) are broken into categories, the machine learning model (146) more accurately and/or more rapidly predict specific source articles from a given category. Other types of models among the multiple machine learning models (148) are possible.

The system shown in FIG. 1A also includes a link generator (160). The link generator (160) is software and/or hardware configured to generate the interactive link (110) of the multiple interactive links (112). For example, the link generator (160) may create a reference to the predicted source article (106) within the data repository (100) which, when interacted with by an agent or a person, calls up the predicted source article (106) from the data repository (100).

Attention is now turned to FIG. 1B. FIG. 1B defines additional details with respect to the training application (126) mentioned with respect to FIG. 1A.

The training application (126) uses training data (162) to train the machine learning model (146). The training data (162) is a data set for which labels are known or reliably predicted. Thus, examples of the training data (162) include digital tokens representing past conversations for which the relevant source articles are already known.

The training data (162) may be segmented into portions, each of which has a corresponding label. For example, the training data (162) may describe the conversations of 10,000 users, but each conversation has a variety of different data describing an individual conversation for which an individual set of relevant source articles are known. The digital tokens for conversation represent a portion of the training data (162). However, a single predicted source article may be applied to a given conversation (the portion of the training data (162)).

The machine learning model (146) includes at least one parameter (164). In some cases, the machine learning model (146) may include multiple parameters. The parameter (164) is a programmable setting that the machine learning algorithm refers to during execution of the machine learning algorithm. An example of the parameter (164) may be a weight, but the nature of the parameter (164) and the number of parameters depend on the type of the machine learning model (146).

The machine learning model (146) also includes at least one updated parameter (166) during the training process. The updated parameter (166) has a value that may be changed relative to the parameter (164). The updated parameter (166) is changed during the training process, as described below.

The result of executing the machine learning model (146) is an output (168). The output (168) is a prediction that a portion of the training data (162) is associated with a particular source article. The output (168) may be multiple predictions of multiple predictions that multiple source articles are relevant to the training data (162).

Whatever the form of the output (168), the output (168) is compared to a known result (170). The known result (170) is the known source article.

Then, a determination is made whether a convergence (172) has occurred. The convergence (172) occurs when the difference (between the output (168) and the known result (170)) on a past training iteration is insufficiently different from the difference (between output (168) and the known result (170)) on the current iteration. The term "insufficient" is defined by a number referred to as a convergence threshold. Stated more simply, the convergence (172) occurs when the difference between the output (168) and the known result (170) does not change sufficiently between training iterations. The convergence (172) may also occur after a predetermined number of iterations of the training process. The convergence (172) may also occur when the known result (170) either matches the output (168) or is within a predetermined value of closeness to the known result (170).

If the convergence (172) has not occurred, then a loss function (174) is generated. The loss function (174) is a calculated estimation of how the parameter (164) and/or the updated parameter (166) should be adjusted in order to change the output (168) to be closer to the known result (170). The loss function (174) may apply to multiple parameters.

The process of executing the machine learning model (146), determining whether the convergence (172) has occurred, and generation of the loss function (174) continues until the convergence (172) is considered. In other words, the process continues until a "yes" result at the convergence (172) determination.

The result of training, after the convergence (172), is a trained machine learning model (176). The trained machine learning model (176) uses the same machine learning algorithm as the machine learning model (146), but the trained machine learning model (176) uses a trained parameter (178) (or set of multiple trained parameters) at runtime instead of the original parameter (164) or updated parameter (166). Because updating the parameter (164) changes the output (168) of the machine learning model (146), the trained machine learning model (176) is, in a real sense, different than the machine learning model (146).

In an embodiment, a computer scientist or other use may elect to discard the trained machine learning model (176). For example, if the final output (168) of the machine learning model (146) after convergence is not acceptable, the user may elect to start training again with another, different machine learning model, or may make other changes to the training process (e.g., the training data set, the parameter, etc.) in order to attempt to achieve a more accurate trained machine learning model (176).

The training application (126) may also include a self-training application. The self-training application is software which, when executed by the server (122), causes the method of FIG. 2B to be performed.

While reference is made to the machine learning model (146), a similar training procedure may be performed with respect to any of the multiple machine learning models (148). Thus, the training technique described with respect to FIG. 1B is not necessarily limited to the machine learning model (146).

While FIG. 1A and FIG. 1B show a configuration of components, other configurations may be used without departing from the scope of the one or more embodiments. For example, various components may be combined to create a single component. As another example, the functionality performed by a single component may be performed by two or more components.

Attention is now turned to FIG. 1C. FIG. 1C shows an example of the structure of the machine learning model (146) shown in FIG. 1A in the context of use of the machine learning model (146). A method of using the machine learning model (146) is shown with respect to FIG. 2A.

The context of the example of FIG. 1C is that a conversation is taking place between an agent and a person. The agent is a customer service representative of a company that offers advice on technical matters for a fee. The person is a customer who is seeking the advice. The customer generates a set of customer utterances (100C). The agent generates a set of agent utterances (102C). Examples of the utterances are shown in FIG. 1C.

The customer utterances (100C) are transformed into digital tokens, represented by the data (104C). The customer utterances (100C) are transformed into another set of digital tokens, represented by the data (106C). In addition, metadata (108C) is gathered with respect to the conversation between the customer and the agent.

The data (104C) of the customer utterances (100C) are embedded into a customer utterances tensor (110C). The data (106C) of the agent utterances (102C) are embedded into an agent utterances tensor (112C). Similarly, the metadata (108C) is embedded into a metadata tensor (114C).

The customer utterances tensor (110C) is then provided to a first kernel (116C) of the machine learning model (146). The agent utterances tensor (112C) is likewise provided to a second kernel (118C) of the machine learning model (146). In machine learning, a kernel refers to an algorithm that allows the application of linear classifiers to nonlinear problems by mapping non-linear data into a higher-dimensional space without the need to understand that higher-dimensional space.

The kernels thus allow the utterances tensors to be mapped to a higher dimensional space for input to the convolution layers of the machine learning model (146). Accordingly, the output of the first kernel (116C) is provided to a first set of convolutional layers (120C) (e.g., the first stack of convolutional layers (150)). Similarly, the output of the second kernel (118C) is provided to a second set of convolutional layers (122C) (e.g., the second stack of convolutional layers (152)).

A first output (124C) of the first set of convolution layers (120C), a second output (126C) of the second set of convolutional layers (122C), and the metadata tensor (128C) are then provided to the concatenation layer (130C). The concatenation layer (130C) concatenates and/or otherwise combines the three data sets.

The output of the concatenation layer (130C) is provided as input to a dense layer (132C) (e.g., the dense layer (156)). The dense layer (132C) produces output values for the multiple source articles (108), as related to the customer utterances tensor (110C), the agent utterances tensor (112C), and the metadata tensor (114C).

The output of the dense layer (132C) is provided to a sigmoid activation function (134C) (e.g., the sigmoid activation function (158)). The sigmoid activation function (134C) converts the output of the dense layer (132C) into a series of probabilities. The series of probabilities reflect the probabilities that any given source article is relevant to the conversation between the customer and the agent.

The predicted source article having the highest probability, or a selected number of the predicted source articles having the highest probabilities, are then selected from the output of the sigmoid activation function (134C). The result of selecting is an output (136C) of the machine learning model (146). The output (136C) become the predicted source articles that will ultimately be used to generate the links for presentation to one or both of the agent and the customer.

FIG. 2A and FIG. 2B are flowcharts, in accordance with one or more embodiments. FIG. 2A is a method of use of the system shown in FIG. 1A or the example machine learning model (146) shown in FIG. 1C. FIG. 2A is a method of training the machine learning model (146) in either FIG. 1A or FIG. 1C. The methods of FIG. 2A and FIG. 2B may therefore be executed using the system shown in FIG. 1, possibly using one or more hardware or software components described with respect to FIG. 4A and FIG. 4B.

Step 200 includes transcribing, into digital tokens, utterances from a conversation between an agent and a person. The digital tokens may be transcribed from the utterances by using a natural language processing machine learning algorithm, which may be part of the machine learning model used for the system performing the method of FIG. 2A. The natural language processing machine learning model may be trained on past utterances by past users.

The natural language processing machine learning model (s) are trained on past utterances by past persons. An example of training is given with respect to FIG. 1B and another example with respect to FIG. 2B.

The digital tokens may also be transcribed by using some other natural language transcription program. Thus, transcription at step 200 need not be performed by one or more natural language machine learning models.

Transcribing the utterances into digital tokens may be broken into stages or may be used to track different aspects of the conversation. For example, the utterances of two parties of a conversation may be transcribed into a first sub-tensor having a first sub-set of digital tokens representing first utterances by an agent, and a second sub-tensor having a second sub-set of digital tokens representing second utterances by a person. In this case, embedding the utterances into the utterances tensor further may include concatenating the first sub-tensor and the second sub-tensor into the utterances tensor. Alternatively, the first and second sub-tensors may be treated and processed separately. Furthermore, more than one sub-tensor may be present, such as one sub-tensor per side or party to a conversation.

Thus, different natural language processing machine learning algorithms (or other programs) may be used to transcribe different aspects of the conversation. For example, the utterances by a first person may be transcribed into the first sub-tensor and the utterances by a second person may be transcribed into a second sub-tensor. Thus, a first subset of digital tokens may be transcribed using a first natural language processing machine learning model, and a second sub-set of digital tokens may be transcribed using a second natural language processing machine learning model trained.

In addition, or alternatively, still further processing may occur subsequent to step 200, but prior to step 202. Continuing the above example, pre-processing may be performed on the first sub-tensor and the second sub-tensor by truncating the first sub-tensor and the second sub-tensor to a maximum length. Truncation may be performed by dropping data that is pre-determined to be of less relevant (e.g. article parts of speech, nonce words, words determined to be off-topic, pre-determined types of digital tokens, etc.).

Step 202 includes embedding the digital tokens into an utterances tensor including sequences of the digital tokens. The digital tokens may be embedded into the utterances tensor or utterance tensors by placing the digital tokens into a vector format of dimensionality "m" by "n" (e.g., "m" rows and "n" columns), though the tensor may have a higher dimensionality. In an embodiment, "m" is 1 and "n" is zero, meaning that the tensor is a one dimensional array.

Step 204 includes obtaining a metadata tensor by encoding metadata related to the utterances into the metadata tensor. The metadata tensor may be encoded by transforming the metadata into vector format of dimensionality "m" by "n", which need not be same number of dimensions as the utterances tensor. The encoding may be a direct encoding (e.g., the information is added to the corresponding entry in the tensor) or indirect encoding (e.g., a mapping function is applied to the information and the output of the mapping function is used for a value in the tensor). In this manner, either the metadata itself, a range of metadata values, or an evaluation of the metadata values (e.g., use a tensor feature value of 1 if the metadata is above a threshold and 0 otherwise), or a combination thereof may form the values of the metadata tensor.

Step 206 includes executing a machine learning model which takes, as input, the utterances tensor and the metadata tensor, and which outputs a predicted source article predicted to be related to the utterances. The utterances tensor and the metadata tensor may be combined (e.g. concatenated) into a combined tensor and then processed as described below. Alternatively, the utterances tensor and the metadata tensor may be separate inputs to different machine learning algorithms in the machine learning model.

In an embodiment, execution of the machine learning model may be delayed until a threshold time has passed since a start of the conversation. In this manner, the resulting utterances tensor and metadata tensor are more likely to be sufficiently rich in available data so as to produce a reliable prediction of a relevant source article. The term "reliable" refers to a pre-determined measure of accuracy of the probability that the predicted source article is actually a source article that is relevant to the conversation.

The machine learning model may operate as follows. The utterances tensor and the metadata tensor are concatenated, as described with respect to FIG. 1C. The concatenated tensor is then provided as input to a dense layer of a machine learning model, as described with respect to FIG. 1C. The dense layer finds patterns in the data between the utterances themselves and between the metadata and the utterances.

The patterns are compared to the keywords of a set of available source articles. The keywords are provided by a user or are taken from the source articles themselves. The output of the dense layer is a set of values that represent the relative correlation between the set of available source articles and the information in the concatenated utterances tensor and metadata tensor.

The output of the dense layer is then provided to a sigmoid activation function. The sigmoid activation function converts the values of the output of the dense layer into a series of fractional numbers (in decimal form). The higher the correlation of a given feature (i.e., for a given source article) in the output, the closer the given feature value will be to 1. Thus, the ultimate output of the sigmoid activation function, known as "argmax," represents a series of probabilities that a given source article is relevant to the conversation.

The highest probability, or highest number of "h" probabilities, may be selected for continued processing. For example, the probability highest to 1 may be selected. In another example, five probabilities closest to 1 may be selected and arranged into an ordered list where the highest probability is placed first and the lowest probability is placed last. In either case, the source articles corresponding to the selected probability or set of selected probabilities are the predicted source article or the predicted source articles.

A specific example of execution of the machine learning model at step 206 is now presented. The machine learning model includes a convolutional neural network.

The first sub-tensor (of digital tokens of utterances of an agent) is applied as input to a first stack of convolutional layers of the machine learning model. A first intermediate output is produced (see convolutional layers (122C) in FIG. 1C).

The second sub-tensor (of digital tokens of utterances of a person) is applied as input to a second stack of convolutional layers of the machine learning model. A second intermediate output is produced (see convolutional layers (120C) in FIG. 1C).

The first intermediate output, the second intermediate output, and the metadata tensor are concatenated to generate a third intermediate output. See, for example, 130C in FIG. 1C.

The third intermediate output (of concatenation) is applied to a dense layer of the machine learning model to generate a fourth intermediate output. See, for example, 132C in FIG. 1C. The fourth intermediate output represents the relative importance of the source articles to the conversation.

The fourth intermediate output is applied to a sigmoid activation function of the machine learning model to generate probabilities that the predicted source articles are related to the fourth intermediate output. See, for example, 134C and 136C of FIG. 1C.

The predicted source article(s) are selected from among the predicted source articles based on the probabilities. Selecting may include generating a list of the predicted source articles ranked in a ranking according to probability. At least one of the predicted source articles is chosen as the predicted source article according to the ranking.

Step 208 includes generating an interactive link to the predicted source article. The interactive link may be generated by copying the location of the predicted source article in a data storage and presenting the location to one or more users, including either person in the conversation or both persons. The interactive link may also be generated by generating a hyperlink to a website where the source article may be retrieved or viewed. The interactive link may also be generated by generating a command which initiates a file transfer command to transfer a file to one or both of the users. Additionally, the interactive link may be transmitted to users other than the people involved in the conversation, such as a third-party observer or a to a third-party person as requested by either person in the conversation.

In any case, the interactive link includes an interactive component (e.g., a hyperlink, file transfer command, copiable storage address location, etc.). The interactive component allows a user that receives the interactive link to retrieve, view, or otherwise access the source article via a graphical user interface.

The interactive link then may be presented to a user. Examples of presenting the interactive link include, but are not limited to, displaying the interactive link to only the agent, displaying the interactive link to only the person, and displaying the interactive link to both the agent and the person.

The method of FIG. 2A may be further expanded. For example, presenting the interactive link to only the agent, a command may be received from the agent to reveal the interactive link. In response, the interactive link is displayed to the person (i.e. the other person(s) in the conversation). Still other variations are possible.

The method of FIG. 2A may be performed in real time. The term "real time" means a time contemporaneous with the conversation. However, as indicated above, a delay in execution of the machine learning model (at step 206) may be set in order to increase a likelihood that the predicted source article is relevant to the conversation.

While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments. By way of an example, determination steps may not require a processor to process an instruction unless an interrupt is received to signify that condition exists in accordance with one or more embodiments. As another example, determination steps may be performed by performing a test, such as checking a data value to test whether the value is consistent with the tested condition in accordance with one or more embodiments. Thus, the one or more embodiments are not necessarily limited by the examples provided herein.

Attention is now turned to FIG. 2B. FIG. 2B is a method of training a machine learning model. The method of FIG. 2B may be performed using the training application (126) described with respect to FIG. 1A using one or more components from the computing system and network environment described with respect to FIG. 4A and FIG. 4B.

Step 220 includes receiving a past utterances tensor including sequences of digital tokens that represent past utterances from a conversation between an agent and a person. A known source article is known to be relevant to the conversation. The past utterances tensor may be derived or generated from recordings of past conversations, from which a known relevant source article was presented to a user during the conversation. The past conversation is converted into digital tokens, as described with respect to FIG.

1A, FIG. 1C, and FIG. 2A, and then the digital tokens are embedded into the past utterances tensor.

Step 222 includes receiving a past metadata tensor representing metadata related to the past utterances. The metadata may be similar to the metadata described with respect to FIG. 1, as the metadata relates to the past conversations. The metadata tensor is similarly generated as described with respect to FIG. 1C and FIG. 2A.

Step 224 includes predicting, using the machine learning model, a predicted source article predicted to be related to the utterances. The machine learning model takes, as input, the past utterances tensor and the past metadata tensor. The machine learning model generates, as output, the predicted source article. The operation of the machine learning model is similar to the operations described with respect to FIG. 1A, FIG. 1C, and FIG. 2A.

Step 226 includes generating a loss function from comparing the predicted source article to the known source article. It is anticipated that, at least initially, the predicted source article and the known source article are different. The loss function may be generated as described with respect to FIG. 1B. For example, the difference in predicted result and the known result may cause a set of weights defined for the machine learning model to change by a degree determined by a loss generation function.

Step 228 includes generating an updated machine learning model by using the loss function to change a parameter of the machine learning model. For example, the degree determined at step 226 may be multiplied by or otherwise combined with the parameter in order to change the parameter. Changing the parameter to the updated parameter effectively changes or transforms the machine learning model to an updated machine learning model, which will (assuming the same input) produce a different predicted source article than the previous iteration of the machine learning model during training.

Step 230 includes determining whether convergence has occurred. If convergence has occurred (a "yes" result), then the process proceeds back to step 220 and repeats. However, this time the machine learning model is the updated machine learning model.

The method continues to iterate until convergence has been achieved (a "yes" result). Once convergence has been achieved, the final state of the machine learning model is deemed to be "trained" and is then referred-to as the trained machine learning model. The trained machine learning model will then be used at runtime to generate predicted source articles during new conversations between persons.

Figure 3A:
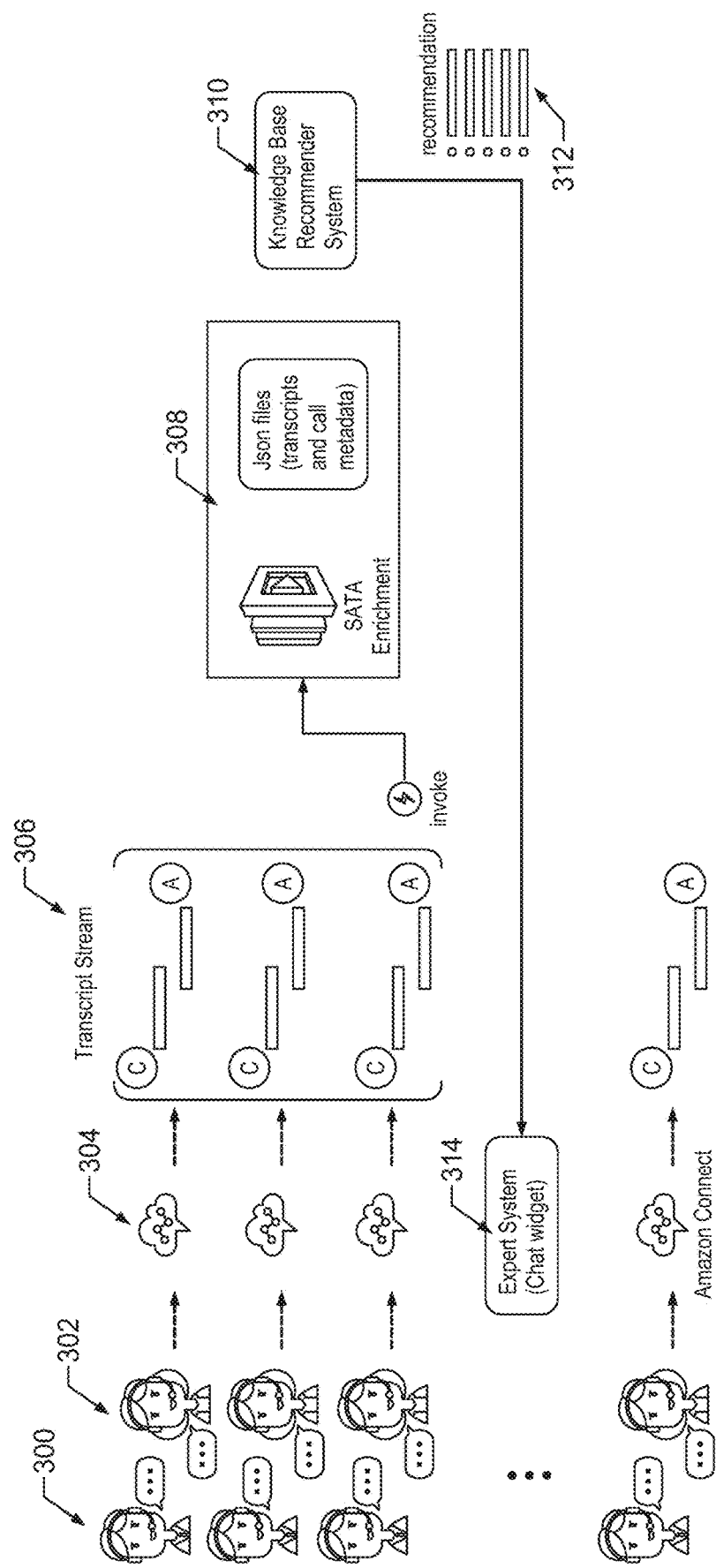
FIG. 3A and FIG. 3B shows an example, in accordance with one or more embodiments.
Figure 3B:
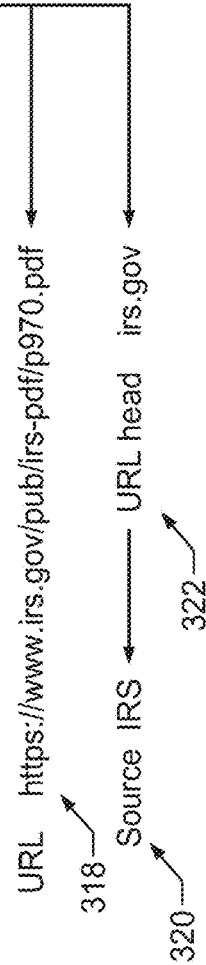

FIG. 3A and FIG. 3B present a specific example of the techniques described above with respect to FIG. 1A through FIG. 2A. The following example is for explanatory purposes only and not intended to limit the scope of the one or more embodiments. The example of FIG. 3A and FIG. 3B may be performed by the system described with respect to FIG. 1A according to the method of FIG. 2A.

In the example of FIG. 3A, a tax preparation company, ABC Inc., owns and operates tax preparation software. To aid customers (300) ABC Inc. provides an expert consultation service. The agents (302) are tax professionals hired by ABC Inc. to provide expert consultation services on tax matters. The customers (300) can call a help line published by ABC Inc., be placed in touch with one of the agents (302), who will provide consultation services for whatever tax questions or issues of interest the customers (300) may have.

In this particular example, the customers (300) are calling using a teleconference service provided or supported by ABC Inc. The teleconference service allow the customers (300) and the agents (302) to engage in conversations with each other. Each conversation between a given customer and a given agent is a separate, private conversation which excludes any other agent or customer. The teleconference service also includes a customer-side graphical user interface (GUI) which includes a customer chat window, as well as an agent-side GUI which includes an agent chat window.

As the conversations proceed, the customer utterances and the agent utterances for each conversation are provided to a transcription service (304). The transcription service (304) generates a transcript stream (306). The transcript stream (306) separately tracks the utterances between the customers (300) and the agents (302).

The transcript is then converted into digital tokens by a pre-processing service (308). The pre-processing service (308) embeds the digital tokens into the customer utterances tensor and the agent utterances tensor. The pre-processing service (308) also generates a metadata tensor from metadata relevant to each conversation.

The three tensors are then provided as input to a knowledge base recommender system (310). The knowledge base recommender system (310) may be the machine learning model (146) of FIG. 1 or the various layers of the machine learning model described with respect to FIG. 1C. The knowledge base recommender system (310) operates according to the method of FIG. 2A.

The output of the knowledge base recommender system (310) is a recommendation (312). A different recommendation is provided for each separate conversation. The recommendation (312) contains an interactive link to a source article relevant to the tax question or issue of the particular customer.

For example, if the customer has called to ask whether gambling winnings are considered taxable income, the predicted source article may be to an United States Internal Revenue Service (IRS) rule which states that gambling winnings are ordinarily considered taxable income. The interactive link may be clicked to take a user straight to an IRS web page on which the rule is published.

As the conversation proceeds, the customer may begin to question whether a prize at a church Bingo game would be considered gambling winnings. The system continues to operate and generates a second interactive link to new source article to an IRS ruling. The ruling specifically states that winnings at a church-held gambling event (such as Bingo) are indeed considered taxable gambling winnings.

The interactive link or links are then presented to the agent in a chat widget (314) on the agent GUI. The agent can then decide whether it is appropriate to reveal the recommended source article to the customer. In some cases, the system may recommend an article that the agent believes is not as helpful, so in this particular example the agent is left with the final decision whether to reveal a predicted source article.

In this example, the agent decides to reveal to the customer both predicted source articles. The agent reveals the interactive link by selecting or activating a function of the teleconferencing system. The customer can then see the interactive links to the predicted source articles in the customer-side of the chat widget (314). The customer can then interact with the interactive links to view the predicted source articles.

In other embodiments, the interactive links to the predicted source articles might appear in the chat boxes of the GUIs for both the agent and the customer concurrently. In another embodiment, the interactive links may appear in pop-up windows for either the customer or agent, or are presented in some other manner. Furthermore, the example is not limited to a tax consultation service, and could apply in a medical consultation service, a scientific collaboration forum, etc. Thus, the one or more embodiments are not necessarily limited to the example shown in FIG. 3A.

FIG. 3B shows an example of an interactive link that may be displayed in the chat widget (314) of FIG. 3A. A summary (316) of the conversation is displayed. The interactive link (318) in this case is a uniform resource link (URL) which the user may select to view the source article in a Web browser. For convenience, the source (320) is shown (in this case the IRS) and the URL head (322) is shown to provide the general home page web address for the organization that hosts the source article (again, the IRS, so the home address is IRS.gov). The source article reachable via the interactive link (318) provides the information that this particular customer was looking for.

Figure 4B:
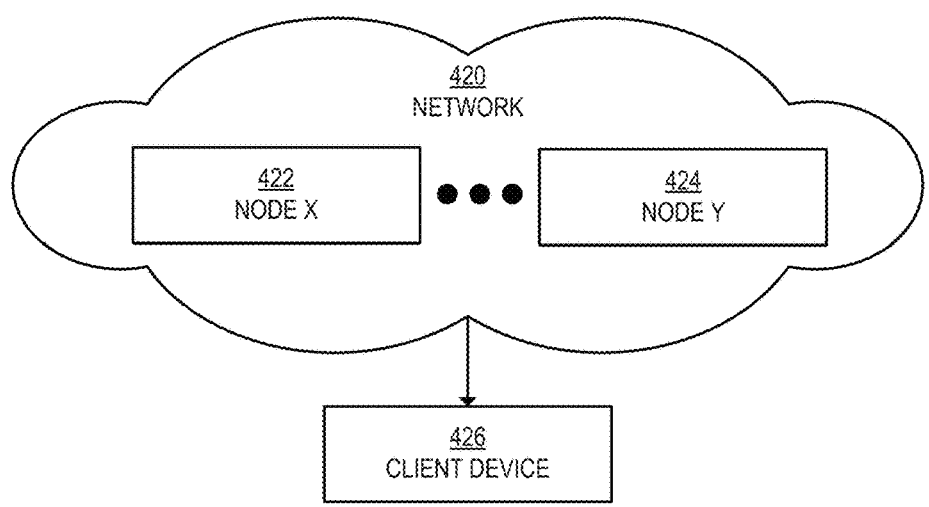

FIG. 4A and FIG. 4B are examples of a computing system and a network, in accordance with one or more embodiments. The one or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 4A, the computing system (400) may include one or more computer processor(s) (402), non-persistent storage device(s) (404) (e.g., volatile memory, such as random access memory (RAM), cache memory), persistent storage device(s) (406) (e.g., a hard disk, an optical drive such as a compact disk (CD) drive or digital versatile disk (DVD) drive, a flash memory, etc.), a communication interface (408) (e.g., Bluetooth interface, infrared interface, network interface, optical interface, etc.), and numerous other elements and functionalities that implement the features and elements of the disclosure.

The computer processor(s) (402) may be an integrated circuit for processing instructions. For example, the computer processor(s) (402) may be one or more cores or micro-cores of a processor. The computing system (400) may also include one or more input device(s) (410), such as a touchscreen, a keyboard, a mouse, a microphone, a touchpad, an electronic pen, or any other type of input device.

The communication interface (408) may include an integrated circuit for connecting the computing system (400) to a network (not shown) (e.g., a local area network (LAN), a wide area network (WAN) such as the Internet, a mobile network, or any other type of network) and/or to another device, such as another computing device.

Further, the computing system (400) may include one or more output device(s) (412), such as a screen (e.g., a liquid crystal display (LCD), a plasma display, a touchscreen, a cathode ray tube (CRT) monitor, a projector, or other display device), a printer, an external storage, or any other output device. One or more of the output device(s) (412) may be the same or different from the input device(s) (410). The input and output device(s) (410 and 412) may be locally or remotely connected to the computer processor(s) (402), the non-persistent storage device(s) (404), and the persistent storage device(s) (406). Many different types of computing systems exist, and the aforementioned input and output device(s) (410 and 412) may take other forms.

Software instructions in the form of computer readable program code to perform the one or more embodiments may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform the one or more embodiments.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system (400) shown in FIG. 4A, or a group of nodes combined may correspond to the computing system (400) shown in FIG. 4A. By way of an example, the one or more embodiments may be implemented on a node of a distributed system that is connected to other nodes. By way of another example, the one or more embodiments may be implemented on a distributed computing system having multiple nodes, where each portion of the one or more embodiments may be located on a different node within the distributed computing system. Further, one or more elements of the aforementioned computing system (400) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system (400) shown in FIG. 4A. Further, the client device (426) may include and/or perform all or a portion of the one or more embodiments.

The computing system (400) or group of computing systems described in FIGS. 4A and 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the one or more embodiments. The processes may be part of the same or different application and may execute on the same or different computing system.

Rather than or in addition to sharing data between processes, the computing system performing the one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the one or more embodiments, may extract one or more data items from the obtained data. For example, the extraction may be performed as follows by the computing system (400) in FIG. 4A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as extensible Markup Language (XML)).

The extracted data may be used for further processing by the computing system. For example, the computing system (400) of FIG. 4A, while performing the one or more embodiments, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (400) in FIG. 4A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (a database, a table, a record, a column, a view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (400) of FIG. 4A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (400) of FIG. 4A and the nodes (e.g., node X (422), node Y (424)) and/or client device (426) in FIG. 4B. Other functions may be performed using one or more embodiments.

While the one or more embodiments have been described with respect to a limited number of embodiments, those skilled in the art, having benefit of this disclosure, will appreciate that other embodiments can be devised which do not depart from the scope of the one or more embodiments as disclosed herein. Accordingly, the scope of the one or more embodiments should be limited only by the attached claims.

What is claimed is:

1. A method comprising:
   transcribing, into a plurality of digital tokens, utterances from a conversation between an agent and a person,
   wherein transcribing the utterances into a plurality of digital tokens further comprises transcribing the utterances into a first sub-tensor comprising a first sub-plurality of digital tokens representing first utterances by the agent, and a second sub-tensor comprising a second sub-plurality of digital tokens representing second utterances by the person;
   embedding the plurality of digital tokens into an utterances tensor comprising sequences of the plurality of digital tokens, wherein embedding the plurality of digital tokens into the utterances tensor further comprises concatenating the first sub-tensor and the second sub-tensor into the utterances tensor;
   obtaining a metadata tensor by encoding metadata related to the utterances into the metadata tensor;
   executing a machine learning model which takes, as input, the utterances tensor and the metadata tensor, and which outputs a predicted source article predicted to be related to the utterances, wherein the machine learning model comprises a convolutional neural network and wherein executing the machine learning model further comprises:
      applying the first sub-tensor to a first stack of convolutional layers of the machine learning model to generate a first intermediate output,
      applying the second sub-tensor to a second stack of convolutional layers of the machine learning model to generate a second intermediate output,
      concatenating the first intermediate output, the second intermediate output, and the metadata tensor to generate a third intermediate output,
      applying the third intermediate output to a dense layer of the machine learning model to generate a fourth intermediate output,
      applying a sigmoid activation function of the machine learning model to the fourth intermediate output to generate a plurality of probabilities that predicted source articles are related to the fourth intermediate output, and selecting the predicted source article from among the predicted source articles based on the plurality of probabilities; and
generating an interactive link to the predicted source article.

2. The method of claim 1, further comprising:
presenting the interactive link in a graphical user interface.

3. The method of claim 1, further comprising:
pre-processing the first sub-tensor and the second sub-tensor, prior to embedding, by truncating the first sub-tensor and the second sub-tensor to a maximum length.

4. The method of claim 1, wherein transcribing further comprises:
transcribing the first sub-plurality of digital tokens using a first natural language processing machine learning model trained on past utterances by past agents; and
transcribing the second sub-plurality of digital tokens using a second natural language processing machine learning model trained on past utterances by past persons.

5. The method of claim 1, wherein selecting comprises:
generating a list of the predicted source articles ranked in a ranking according to probability; and
choosing at least one of the predicted source articles as the predicted source article according to the ranking.

6. The method of claim 1, wherein:
the predicted source article comprises a plurality of source articles, and
the interactive link comprises a plurality of interactive links for the plurality of source articles.

7. The method of claim 1, wherein executing the machine learning model begins after a threshold time has passed since a start of the conversation.

8. The method of claim 1, further comprising:
combining, prior to input to the machine learning model, the utterances tensor and the metadata tensor into a combined tensor; and
dropping pre-determined types of tokens from the combined tensor.

9. The method of claim 1, wherein presenting the interactive link is selected from the group consisting of:
displaying the interactive link to only the agent,
displaying the interactive link to only the person, and
displaying the interactive link to both the agent and the person.

10. The method of claim 1,
wherein presenting the interactive link comprises presenting the interactive link only to the agent, and
wherein presenting further comprises:
receiving a command from the agent to reveal the interactive link, and
displaying, after receiving the command, the interactive link to the person.

11. The method of claim 1,
wherein transcribing, embedding, obtaining, executing, generating, and presenting the interactive link are performed in real time, and
wherein real time comprises a time contemporaneous with the conversation.

12. A system comprising:
a processor;
a data repository in communication with the processor and storing:
a plurality of digital tokens generated from utterances transcribed from a conversation between an agent and a person,
an utterances tensor comprising sequences of the plurality of digital tokens embedded into a tensor data structure,
a metadata tensor, and
an interactive link to a predicted source article;
a transcription engine configured to transcribe the utterances into the plurality of digital tokens, wherein the transcription engine is further configured to transcribe the utterances into a first sub-tensor comprising a first sub-plurality of digital tokens representing first utterances by the agent, and a second sub-tensor comprising a second sub-plurality of digital tokens representing second utterances by the person;
a pre-processing engine configured to:
embed the plurality of digital tokens into the utterances tensor,
encode metadata related to the utterances into the metadata tensor, and
concatenate the first sub-tensor and the second sub-tensor into the utterances tensor; and
a machine learning model comprising a convolutional neural network comprising a first stack of convolutional layers, a second stack of convolutional layers, a concatenation layer, a dense layer, and a sigmoid activation function, wherein the machine learning model is configured to:
take, as input the utterances tensor and the metadata tensor,
apply the first sub-tensor to the first stack of convolutional layers to generate a first intermediate output,
apply the second sub-tensor to the second stack of convolutional layers to generate a second intermediate output,
apply the first intermediate output, the second intermediate output, and the metadata tensor to the concatenation layer to generate a third intermediate output by concatenating the first intermediate output, the second intermediate output, and the metadata tensor,
apply the third intermediate output to the dense layer to generate a fourth intermediate output,
apply the fourth intermediate output to the sigmoid activation function to generate a plurality of probabilities that a plurality of predicted source articles is related to the fourth intermediate output, and
select, based on the plurality of probabilities, the predicted source article from among the plurality of predicted source articles, and
a link generator configured to generate the interactive link to the predicted source article.

13. The system of claim 12 further comprising:
a graphical user interface configured to present the interactive link.

14. The system of claim 12, further comprising:
a natural language machine learning model configured to:
take, as input the utterances encoded in a digital format, and
output the plurality of digital tokens.

15. A method of training a machine learning model, comprising:
receiving a past utterances tensor comprising sequences of digital tokens that represent past utterances from a conversation between an agent and a person, wherein a known source article is known to be relevant to the conversation;

receiving a past metadata tensor representing metadata related to the past utterances;
predicting, using the machine learning model, a predicted source article predicted to be related to the utterances, wherein the machine learning model takes, as input, the past utterances tensor and the past metadata tensor, and wherein the machine learning model generates, as output, the predicted source article;
generating a loss function from comparing the predicted source article to the known source article, wherein the predicted source article and the known source article are different;
generating an updated machine learning model by using the loss function to change a parameter of the machine learning model; and
establish a trained machine learning model by repeating, until convergence, receiving the past utterances tensor, receiving the past metadata tensor, predicting the predicted source article, generating the loss function, and generating the updated machine learning model.

* * * * *